(12) United States Patent
Yamazaki et al.

(10) Patent No.: US 11,199,236 B2
(45) Date of Patent: Dec. 14, 2021

(54) SUSPENSION DEVICE

(71) Applicant: YAMAHA HATSUDOKI KABUSHIKI KAISHA, Iwata (JP)

(72) Inventors: Yutaka Yamazaki, Shizuoka (JP); Yutaka Nakamura, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/766,824

(22) PCT Filed: Nov. 27, 2017

(86) PCT No.: PCT/JP2017/042421
§ 371 (c)(1),
(2) Date: May 26, 2020

(87) PCT Pub. No.: WO2019/102620
PCT Pub. Date: May 31, 2019

(65) Prior Publication Data
US 2020/0284312 A1    Sep. 10, 2020

(51) Int. Cl.
*F16F 9/32* (2006.01)
*F16F 9/06* (2006.01)
*F16F 9/36* (2006.01)

(52) U.S. Cl.
CPC ............ *F16F 9/3214* (2013.01); *F16F 9/062* (2013.01); *F16F 9/3221* (2013.01); *F16F 9/368* (2013.01)

(58) Field of Classification Search
CPC .. F16F 9/061; F16F 9/062; F16F 9/063; F16F 9/065; F16F 9/14; F16F 9/16; F16F 9/165;
(Continued)

(56) References Cited

U.S. PATENT DOCUMENTS 4,561,164 A    12/1985    Wössner et al.
6,592,108 B1    7/2003    Lüde
(Continued)

FOREIGN PATENT DOCUMENTS

DE    10 2006 010 245 A1    9/2007
GB    1 529 579 A    10/1978
(Continued)

OTHER PUBLICATIONS

Official Communication issued in International Patent Application No. PCT/JP2017/042421, dated Jan. 23, 2018.
(Continued)

*Primary Examiner* — Robert A. Siconolfi
*Assistant Examiner* — Stephen M Bowes
(74) *Attorney, Agent, or Firm* — Keating and Bennett, LLP

(57) ABSTRACT

In a suspension device, a first piston is movable in an axial direction inside of a cylinder, and an inner pipe that extends in the axial direction is provided inside of the cylinder. A first rod is coupled to the first piston and inserted into the inner pipe. A second rod is coupled to the first piston and projects outwardly from the cylinder. A second piston is movable in the axial direction while sealing a space between an outer surface of the inner pipe and an inner surface of the cylinder. A first gas chamber is located between the second piston and a closure to be arranged outside of the inner pipe. A second gas chamber is located inside of the inner pipe. The first rod includes a first inner passage that communicates with the second gas chamber, and the second rod includes a second inner passage that communicates with the first inner passage.

4 Claims, 11 Drawing Sheets

(58) Field of Classification Search
CPC .... F16F 9/18; F16F 9/182; F16F 9/185; F16F 9/22; F16F 9/32; F16F 9/3214; F16F 9/3235; F16F 9/3242
IPC .......................................................... F16F 9/32
See application file for complete search history.

(56) References Cited

U.S. PATENT DOCUMENTS

| | | |
|---|---|---|
| 2007/0262501 A1 | 11/2007 | Cheever et al. |
| 2011/0181009 A1 | 7/2011 | Lude et al. |
| 2016/0243913 A1* | 8/2016 | Yamazaki .............. B60G 13/06 |

FOREIGN PATENT DOCUMENTS

| | | | |
|---|---|---|---|
| JP | 57-103948 A | | 6/1982 |
| JP | 57-175833 U | | 11/1982 |
| JP | 2008-248955 A | | 10/2008 |
| JP | 2009127760 A | * | 6/2009 |
| JP | 2009202193 A | * | 9/2009 |
| JP | 2010071413 A | * | 4/2010 |
| JP | 2011038551 A | * | 2/2011 |
| JP | 2011-163537 A | | 8/2011 |
| JP | 4996957 B2 | | 8/2012 |
| JP | 2016-065627 A | | 4/2016 |
| JP | 5997392 B2 | | 9/2016 |

OTHER PUBLICATIONS

Official Communication issued in corresponding European Patent Application No. 17/933,040.2, dated Oct. 14, 2020.

\* cited by examiner

SUSPENSION DEVICE

BACKGROUND OF THE INVENTION

1. Field of the Invention

The present invention relates to a suspension device to be attached to a mobile object such as a vehicle.

2. Description of the Related Art

A hydraulic shock absorber described in JP 5997392 B2 includes a cylinder and a piston rod. In the cylinder, first to third hydraulic chambers and a gas chamber are formed. The first to third hydraulic chambers are filled with an operating oil, and the gas chamber is filled with gas.

The piston rod is constituted by a main piston rod and a sub-piston rod. The upper end of the sub-piston rod is coupled to the lower end of the main piston rod. A piston is fixed between the main piston rod and the sub-piston rod, and separates the first hydraulic chamber from the second hydraulic chamber.

A lid member is provided at the lower end of the cylinder. A pipe extending upwardly is fixed to the lid member. A second support and a free piston are fitted into the pipe. The second support separates the second hydraulic chamber from the third hydraulic chamber, and the free piston separates the third hydraulic chamber from the gas chamber.

In a natural state where no force is applied from the outside, the force caused by the difference between a pressure-receiving area facing the first hydraulic chamber and a pressure-receiving area facing the second hydraulic chamber is exerted on the piston. Specifically, in a case where the pressure-receiving area facing the first hydraulic chamber is larger than the pressure-receiving area facing the second hydraulic chamber, the force that moves the piston downwardly is exerted in the natural state. Thus, the hydraulic shock absorber contracts in the natural state.

A hydraulic controller is attached to a mobile object such as a vehicle with the piston rod projecting from the cylinder by a predetermined amount. When the hydraulic shock absorber that contracts in the above-mentioned natural state is attached to the mobile object, it is necessary to pull out the piston rod from the cylinder using a dedicated jig, for example. Therefore, complicated work is required, so that a burden on an operator is large.

SUMMARY OF THE INVENTION

Preferred embodiments of the present invention provide suspension devices each being attachable to a mobile object without complicated work.

A suspension device according to a preferred embodiment of the present invention includes a cylinder including an axial center extending in one direction and first and second ends, a first piston movable in an axial direction inside of the cylinder, an inner pipe inside of the cylinder and extending in the axial direction between the first piston and the first end, a first rod coupled to the first piston and extending in the axial direction to be inserted into the inner pipe, a second rod coupled to the first piston and extending in the axial direction to project outwardly from the cylinder through the second end, a closure that closes the first end, a first support that supports the second rod that is movable in the axial direction while closing the second end, a second piston that is movable in the axial direction while sealing a space between an outer surface of the inner pipe and an inner surface of the cylinder, wherein a first liquid chamber is located between the first piston and the first support, and inside of the cylinder, a second liquid chamber is located between the first piston and the second piston, inside of the cylinder and outside of the inner pipe, a liquid passage that connects the first liquid chamber to the second liquid chamber is located in the first piston, and liquid is sealed in the first and second liquid chambers, a first gas chamber is located between the second piston and the closure, inside of the cylinder and outside of the inner pipe, a second gas chamber in which gas is sealed is located inside of the inner pipe, the first rod includes a first inner passage that communicates with the second gas chamber, and the second rod includes a second inner passage that communicates with the first inner passage.

In this suspension device, the first and second rods are coupled to the first piston provided inside of the cylinder. The first rod is inserted into the inner pipe in the cylinder, and the second rod projects outwardly from the cylinder. When the force in the axial direction is applied to the suspension device, the first and second rods and the first piston are moved integrally in the axial direction. In this case, the liquid flows between the first liquid chamber and the second liquid chamber through the liquid passage in the first piston. A damping force is generated due to the flow of liquid, so that shock absorbing effects are provided.

The second gas chamber is located inside of the inner pipe. The first inner passage that communicates with the second gas chamber is provided in the first rod, and the second inner passage that communicates with the first inner passage is provided in the second rod. In this case, gas is able to be introduced into the second gas chamber or gas is able to be withdrawn from the second gas chamber, through the second inner passage and the first inner passage. Thus, the pressure in the second gas chamber is able to be increased or decreased, and the first and second rods are able to be moved integrally in the axial direction. Therefore, a projection length of the second rod from the cylinder is able to be easily adjusted. As a result, it is possible to attach the suspension device to the mobile object such as a vehicle without complicated work, so that a burden on an operator is able to be reduced.

The closure may include a concave portion directed inwardly of the cylinder, and the suspension device may further include a fitting portion that is fitted to the concave portion while closing an end of the inner pipe. In this case, the inner pipe is able to be easily positioned at a time of assembly of the suspension device.

A gas passage that communicates with the first gas chamber may be located in at least one of the closure and the fitting portion. In this case, gas is able to be easily introduced into the first gas chamber through the gas passage.

The suspension device may further include a second support that supports the inner pipe with respect to the cylinder while being located between the first piston and the second piston. In this case, the position of the inner pipe in the cylinder is prevented from deviating. Thus, the inner pipe is prevented from interfering with the movement of the first and second rods.

The second rod may include a gas inlet outlet port that opens outside of the cylinder, the second inner passage may communicate with an outer space through the gas inlet outlet port, the suspension device may further include a valve attached to the gas inlet outlet port, and the valve may be configured to enable introduction of gas into the second inner passage and block a flow-out of gas from the second inner passage. In this case, gas is introduced into the second inner passage through the valve, such that the projection length of the second rod from the cylinder is able to be easily adjusted. Further, because a flow of gas from the second inner passage is blocked by the valve, the adjusted projection length of the second rod is able to be stably maintained.

A pressure-receiving area of the first piston that receives pressure from the first liquid chamber in the axial direction may be larger than a pressure-receiving area of the first piston that receives pressure from the second liquid chamber in the axial direction.

In this case, with no force applied to the suspension device from the outside, the force applied from the second liquid chamber to the first piston in the axial direction is larger than the force applied from the first liquid chamber to the first piston in the axial direction. Such a suspension device is attached to the mobile object such that a floating sensation to be experienced by the rider is reduced when the mobile object turns. Therefore, riding comfort is improved.

Meanwhile, because the projection length of the second rod is small with no force applied to the suspension device from the outside, it is necessary to pull out the second rod from the cylinder when the suspension device is attached to the mobile object. With this configuration, the projection length of the second rod from the cylinder is able to be easily adjusted. Thus, an increase in work burden at the time of attachment of the suspension device is reduced or prevented.

Preferred embodiments of the present invention enable suspension devices each to be attached to a mobile object such as a vehicle without complicated work.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Suspension devices according to preferred embodiments of the present invention will be described below with reference to the drawings.

Figure 1:
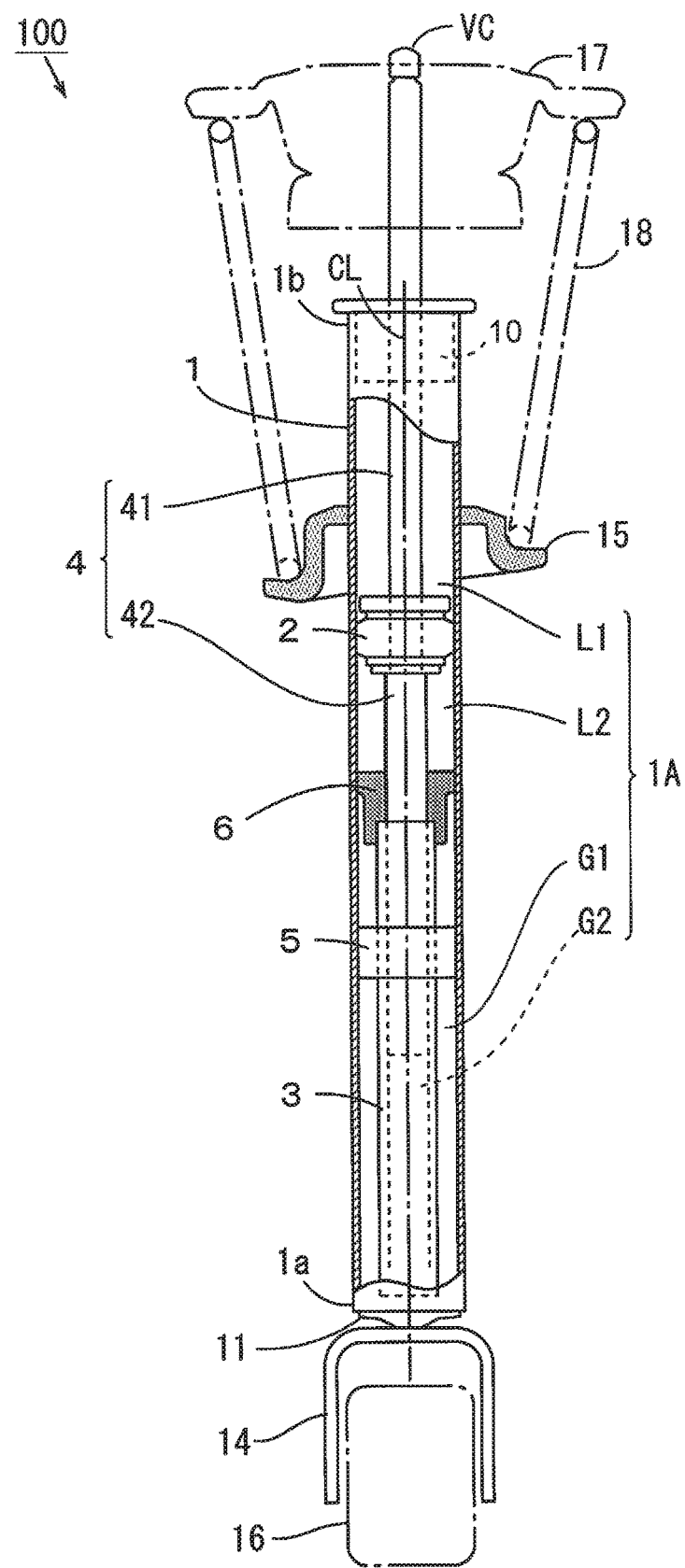
FIG. 1 is a schematic cross sectional view showing an overall configuration of a suspension device according to a preferred embodiment of the present invention.

FIG. 1 is a schematic cross sectional view showing the overall configuration of the suspension device according to a preferred embodiment of the present invention. The suspension device 100 of FIG. 1 is attached to a mobile object such as a vehicle. As shown in FIG. 1, the suspension device 100 includes a cylinder 1, a piston 2, an inner pipe 3, a piston rod 4 and a free piston 5.

The cylinder 1 has an axial center CL extending in one direction (a top-and-bottom direction in the present example), and a cylinder chamber 1A is located inside of the cylinder 1. In the following description, the direction parallel or substantially parallel to the axial center CL is referred to as an axial direction. Further, the direction extending along a circle centered at the axial center CL is referred to as a circumferential direction, and the direction orthogonal or substantially orthogonal to the axial center CL is referred to as a radial direction.

The piston 2 is movable in the axial direction in the cylinder chamber 1A. The inner pipe 3 is provided in the cylinder chamber 1A to extend in the axial direction between the piston 2 and a lower end 1a of the cylinder 1. The axial center of the inner pipe 3 coincides with the axial center CL of the cylinder 1. A closure 11 is attached to the lower end 1a of the cylinder 1. An attachment 14 is coupled to the lower surface of the closure 11. The attachment 14 has a U-shaped cross section and projects downwardly from the closure 11.

The piston rod 4 is coupled to the piston 2 and extends in the axial direction. The piston rod 4 includes an upper rod 41 extending upwardly from the piston 2 and a lower rod 42 extending downwardly from the piston 2. At least a portion of the lower rod 42 is inserted into the inner pipe 3. The upper rod 41 projects upwardly from the cylinder 1 through an upper end 1b of the cylinder 1. A support closure 10 is attached to the upper end 1b of the cylinder 1. The support closure 10 closes the upper end 1b of the cylinder 1, and supports the upper rod 41 that is movable in the axial direction. A valve cover VC is attached to the upper end of the upper rod 41.

The free piston 5 is movable in the axial direction in the cylinder chamber 1A while sealing the space between the inner peripheral surface of the cylinder 1 and the outer peripheral surface of the inner pipe 3. A support 6 is located between the piston 2 and the free piston 5. The support 6 supports the inner pipe 3 with respect to the cylinder 1.

The cylinder chamber 1A is sectioned into liquid chambers L1, L2 and gas chambers G1, G2 by the support closure 10, the piston 2, the inner pipe 3, the free piston 5 and the closure 11. Specifically, the liquid chamber L1 is located between the support closure 10 and the piston 2, the liquid chamber L2 is located outside of the inner pipe 3 and between the piston 2 and the free piston 5, and the gas chamber G1 is located outside of the inner pipe 3 and between the free piston 5 and the closure 11. Further, the gas chamber G2 is located inside of the inner pipe 3. Liquid is sealed in the liquid chambers L1, L2, and gas is sealed in the gas chambers G1, G2. In the present example, the liquid sealed in the liquid chambers L1, L2 is oil. The gas sealed in the gas chambers G1, G2 is nitrogen, for example.

As indicated by one-dot and dash lines in FIG. 1, a coupling 16 is attached to the attachment 14, and a coupling 17 is attached to the piston rod 4. The attachment 14 is coupled to one portion (a lower arm 203 mentioned below, for example) of the mobile object with the coupling 16. The piston rod 4 is coupled to another portion (a vehicle body 201 mentioned below, for example) of the mobile object with the coupling 17. Further, a spring holder 15 is attached to the outer peripheral surface of the cylinder 1. A coil spring 18 is attached between the spring holder 15 and the coupling 17 while being compressed. The spring holder 15 and the coupling 17 are biased by the coil spring 18 in the directions away from each other.

The force in the axial direction is applied from the mobile object to the suspension device 100. As a result, the piston 2 and the piston rod 4 are integrally moved in the axial direction with respect to the cylinder 1. Thus, the length by which the piston rod 4 projects upwardly from the cylinder 1 (hereinafter referred to as a projection length) changes. Thus, the suspension device 100 extends and contracts in the axial direction.

Figure 2:
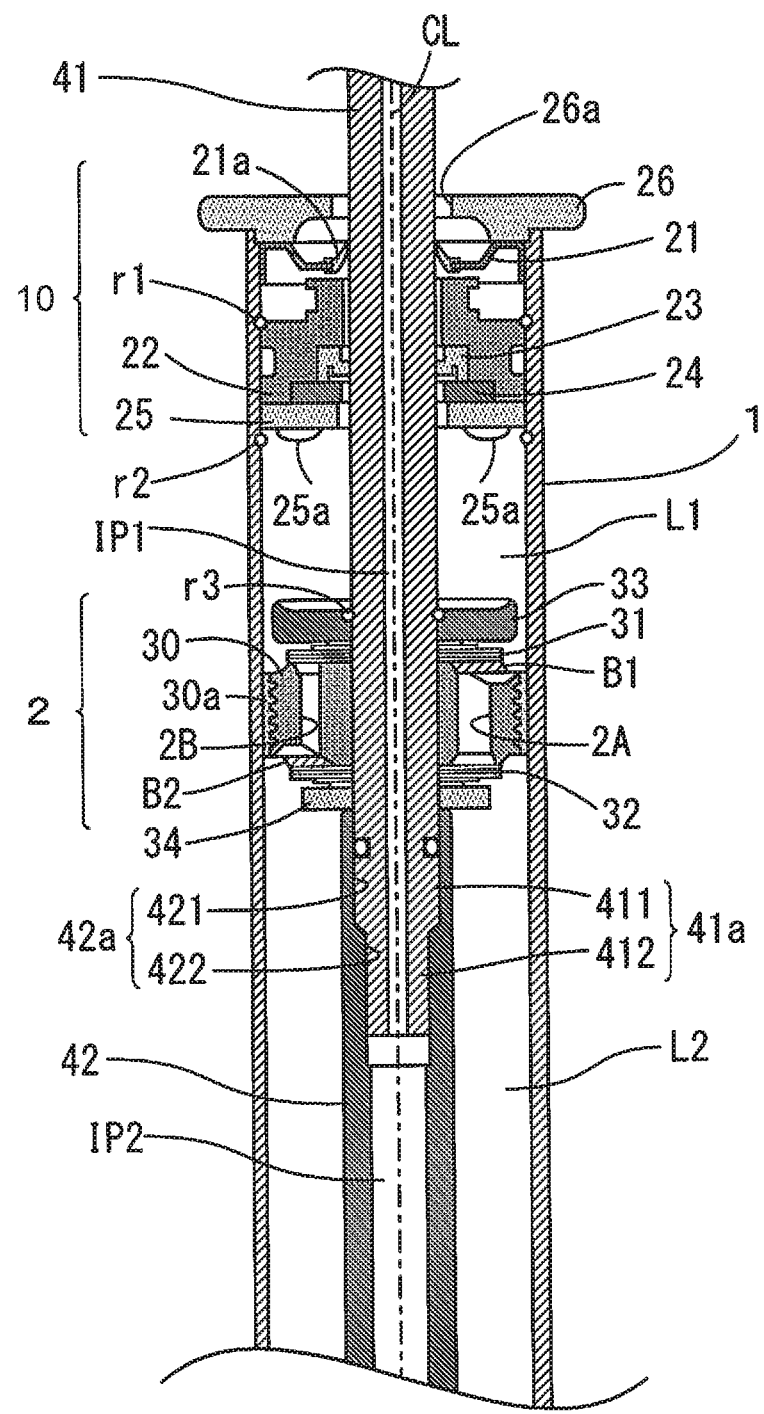
FIG. 2 is an enlarged cross sectional view of an upper portion of a cylinder chamber.
Figure 3:
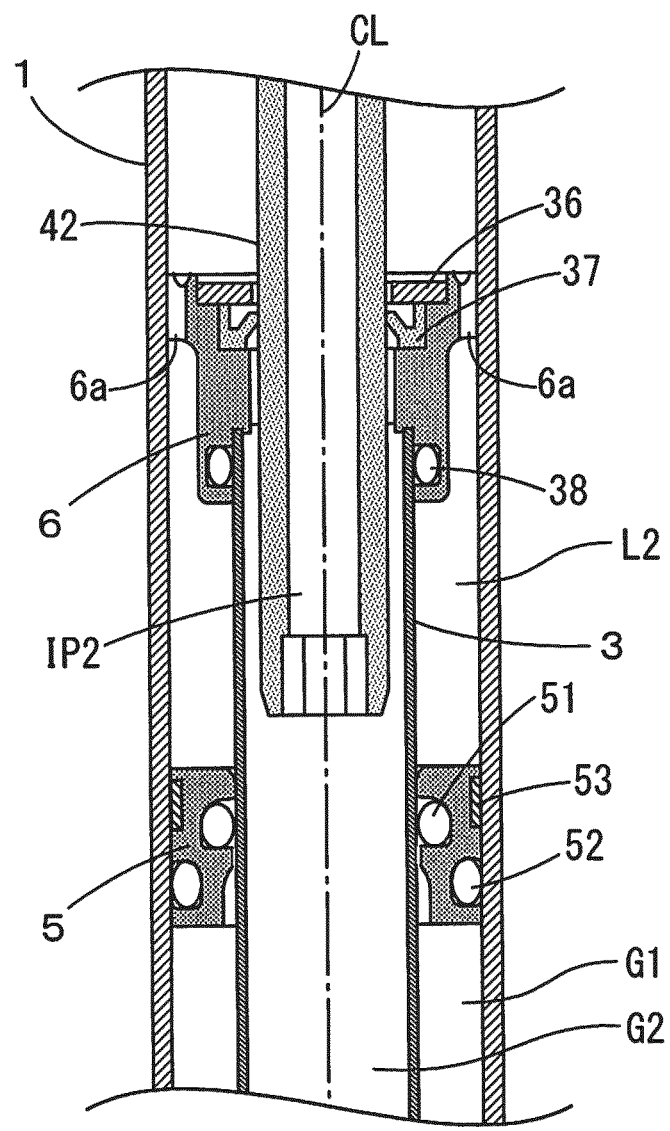
FIG. 3 is an enlarged cross sectional view of a middle portion of the cylinder chamber.
Figure 4:
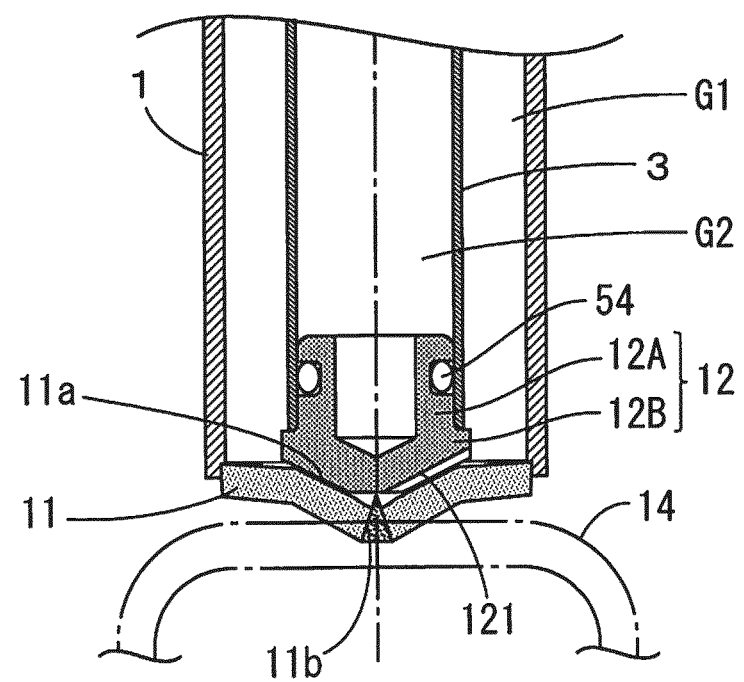
FIG. 4 is an enlarged cross sectional view of a lower portion of the cylinder chamber.
Figure 5:
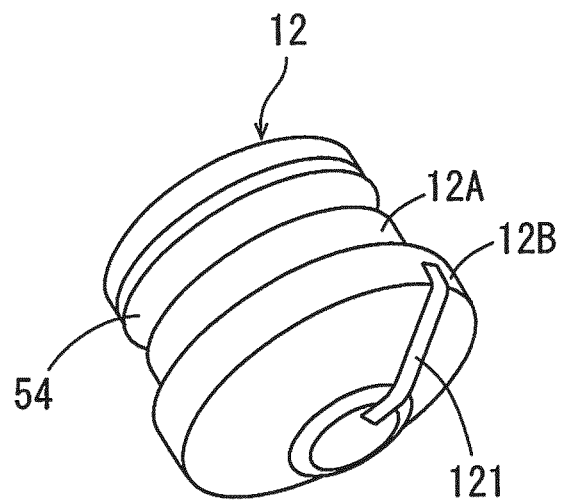
FIG. 5 is an external perspective view of a fitting.
Figure 6:
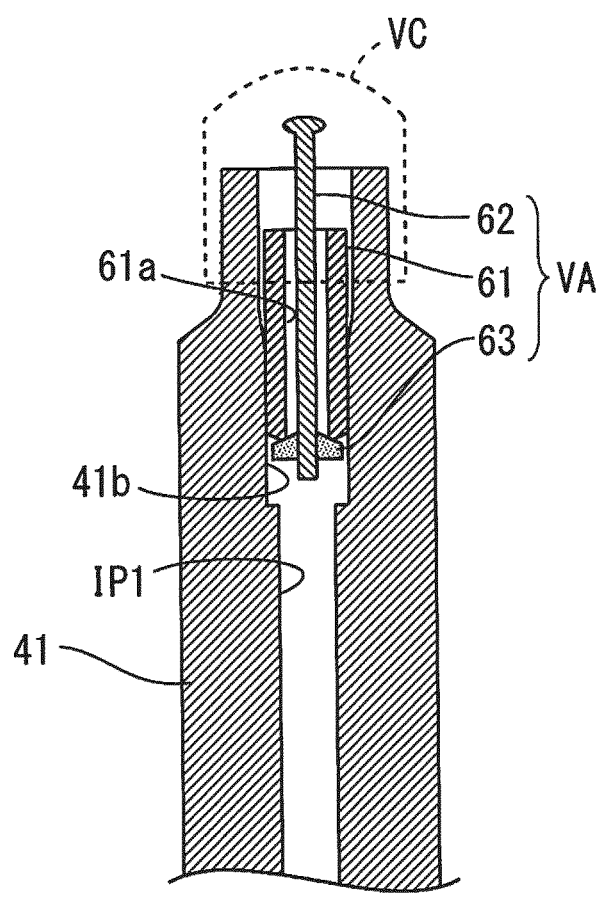
FIG. 6 is an enlarged cross sectional view of an upper end of an upper rod.

The detailed configuration of the suspension device 100 will be described. FIG. 2 is an enlarged cross sectional view of the upper portion of the cylinder chamber 1A. FIG. 3 is an enlarged cross sectional view of the middle portion of the cylinder chamber 1A. FIG. 4 is an enlarged cross sectional view of the lower portion of the cylinder chamber 1A. FIG. 5 is an external perspective view of a fitting attached to the inner pipe 3. FIG. 6 is an enlarged cross sectional view of the upper end of the upper rod 41. In the following description, the state in which the force in the axial direction is not applied to the suspension device 100 is referred to as a no-load state.

As shown in FIG. 2, the support closure 10 includes an annular stopper 21, a substantially cylindrical seal 22, an annular oil seal 23, an annular washer 24, an annular engaging member 25 and a lid 26.

The lid 26 is attached to an opening at the upper end of the cylinder 1. A through hole 26a is located in the center portion of the lid 26. The upper rod 41 extends in the axial direction through the through hole 26a. The stopper 21 is provided to abut against the lower surface of the lid 26 and abut against the inner peripheral surface of the cylinder 1. A dustproof member 21a made of rubber, for example, is attached to the inner periphery of the stopper 21. The dustproof member 21a prevents dust or the like from entering the cylinder 1 from the outside. The seal 22 is provided below the stopper 21 to abut against the inner peripheral surface of the cylinder 1. The oil seal 23 and the washer 24 are arranged in the top-and-bottom direction at the inner periphery of the seal 22. The inner periphery of the oil seal 23 comes into contact with the outer peripheral surface of the upper rod 41. The upper rod 41 moves in the axial direction while sliding with respect to the oil seal 23. In this case, the liquid-tightness between the inner periphery of the seal 22 and the outer peripheral surface of the upper rod 41 is provided by the oil seal 23. The engaging member 25 is arranged to abut against the lower surface of the seal 22 and the lower surface of the washer 24. A plurality of convex portions 25a are provided at the lower surface of the engaging member 25 to be arranged in the circumferential direction.

Fixing rings r1, r2 are fixed to the inner peripheral surface of the cylinder 1. The upward movement of the seal 22 is limited by the fixing ring r1, and the downward movement of the engaging member 25 is limited by the fixing ring r2. Thus, the seal 22, the oil seal 23, the washer 24 and the engaging member 25 are integrally held.

A fitting portion 41a is provided at the lower end of the upper rod 41. The fitting portion 41a includes a large diameter portion 411 and a small diameter portion 412 arranged in the top-and-bottom direction. The outer diameter of the large diameter portion 411 is equal or substantially equal to the outer diameter of the portion located farther upward than the fitting portion 41a of the upper rod 41. The outer diameter of the small diameter portion 412 is smaller than the outer diameter of the large diameter portion 411. A fitting hole 42a is provided in the upper end of the lower rod 42. The fitting hole 42a includes a large diameter hole 421 and a small diameter hole 422 that are arranged in the top-and-bottom direction. The inner diameter of the large diameter hole 421 of the fitting hole 42a is equal or substantially equal to the outer diameter of the large diameter portion 411 of the fitting portion 41a, and the inner diameter of the small diameter hole 422 of the fitting hole 42a is equal or substantially equal to the outer diameter of the small diameter portion 412 of the fitting portion 41a.

The fitting portion 41a is fitted to the fitting hole 42a, so that the upper rod 41 and the lower rod 42 are coupled to each other. In this case, the stepped surface between the large diameter portion 411 and the small diameter portion 412 of the fitting portion 41a abuts against the stepped surface between the large diameter hole 421 and the small diameter hole 422 of the fitting hole 42a. Screw threads corresponding to each other may be provided in the outer peripheral surface of the fitting portion 41a and the inner peripheral surface of the fitting hole 42a, and these screw threads may be engaged with each other.

An inner passage IP1 extending in the axial direction is provided in the upper rod 41, and an inner passage IP2 extending in the axial direction is provided in the lower rod 42. With the upper rod 41 and the lower rod 42 coupled to each other, the inner passage IP1 and the inner passage IP2 communicate with each other.

The piston 2 includes a cylindrical or substantially cylindrical piston main body 30, annular valve plates 31, 32, an annular abutment 33 and a washer 34. In the piston main body 30, a plurality of through holes 2A and a plurality of through holes 2B are arranged in the circumferential direction. In FIG. 2, only one through hole 2A and one through hole 2B are shown. Each through hole 2A extends in the axial direction and extend outwardly in the radial direction along the upper surface of the piston main body 30. Each through hole 2B extends in the axial direction and extend outwardly in the radial direction along the lower surface of the piston main body 30. Hereinafter, an opening of each of the through holes 2A, 2B closer to the upper surface of the piston main body 30 is referred to as an upper end opening, and an opening of each of the through holes 2A, 2B closer to the lower surface of the piston main body 30 is referred to as a lower end opening.

A piston ring 30a is attached to the outer peripheral surface of the piston main body 30. The outer peripheral surface of the piston ring 30a slidably comes into contact with the inner peripheral surface of the cylinder 1. The piston ring 30a defines and functions as a sliding bearing. In the present example, fine irregularities are located on the outer peripheral surface of the piston main body 30, and the piston ring 30a is attached to cover the irregularities. In this case, detachment of the piston ring 30a from the piston main body 30 is prevented by the friction force generated between the piston main body 30 and the piston ring 30a.

The valve plates 31, 32 are provided to respectively abut against the upper surface and the lower surface of the piston main body 30. In the no-load state, the valve plates 31 close the upper end opening of each through hole 2B, and the valve plates 32 close the lower end opening of each through hole 2A. The valve plates 31, 32 have flexibility. When the outer periphery of the valve plates 31 is bent upwardly, the upper end openings of the through holes 2B are opened.

Further, when the outer periphery of the valve plates 32 is bent downwardly, the lower end openings of the through holes 2A are opened.

A limiter B1 is provided at the upper end openings of the through holes 2A to abut against the valve plate 31. A limiter B2 is provided at the lower end openings of the through holes 2B to abut against the valve plate 32. Portions of the upper end openings of the through holes 2A are exposed outwardly in the radial direction of the limiter B1 towards the liquid chamber L1. Further, portions of the lower end openings of the through holes 2B are exposed outwardly in the radial direction of the limiter B2 towards the liquid chamber L2. The limiter B1 limits downward bending of the valve plates 31 to prevent the valve plates 31 from closing the upper end openings of the through holes 2A. The limiter B2 limits upward bending of the valve plates 32 to prevent the valve plates 32 from closing the lower end openings of the through holes 2B.

The abutment 33 is provided above the valve plates 31 to be adjacent to the valve plates 31. The upward movement of the piston 2 is blocked by abutment of convex portions 25a of the engaging member 25 against the upper surface of the abutment 33. The washer 34 is provided below the valve plates 32 to be adjacent to the valve plates 32.

A fixing ring r3 is fixed to the outer peripheral surface of the upper rod 41. The upward movement of the abutment 33 with respect to the upper rod 41 is limited by the fixing ring r3. The upper end of the lower rod 42 abuts against the lower surface of the washer 34. Thus, the downward movement of the washer 34 with respect to the upper rod 41 is limited. The limitation of the upward movement of the abutment 33 and the downward movement of the washer 34 causes the piston main body 30, the valve plates 31, 32, the abutment 33 and the washer 34 to be integrally held on the outer peripheral surface of the upper rod 41.

As shown in FIG. 3, the support 6 is cylindrical or substantially cylindrical and fixed to the inner peripheral surface of the cylinder 1. At the outer periphery of the support 6, a plurality of liquid passages 6a respectively extending in the axial direction are arranged in the circumferential direction. The oil in the liquid chamber L2 flows through the liquid passages 6a. An annular washer 36 and an annular oil seal 37 are arranged in the top-and-bottom direction at the inner periphery of the support 6. An O ring 38 is attached to the inner periphery of the lower portion of the support 6. The upper end of the inner pipe 3 is fitted to the lower portion of the support 6 to come into contact with the O ring 38. The inner pipe 3 is supported by the support 6, so that the position of the inner pipe 3 in the cylinder 1 is prevented from deviating. Thus, the inner pipe 3 is prevented from interfering with the movement of the piston rod 4.

The oil seal 37 comes into contact with the outer periphery of the lower rod 42. The lower rod 42 moves in the axial direction while sliding with respect to the oil seal 37. The liquid tightness between the inner periphery of the support 6 and the outer peripheral surface of the lower rod 42 is provided by the oil seal 37. Further, the liquid tightness between the inner periphery of the support 6 and the outer peripheral surface of the inner pipe 3 is provided by the O ring 38. The oil in the liquid chamber L2 is prevented from flowing into the inner pipe 3 by the oil seal 37 and the O ring 38.

The inner passage IP2 opens at the lower end of the lower rod 42. Thus, the inner passage IP2 and the gas chamber G2 in the inner pipe 3 communicate with each other.

An O ring 51 is attached to the inner periphery of the free piston 5. An O ring 52 and a piston ring 53 are attached to the outer periphery of the free piston 5. The liquid tightness between the inner periphery of the free piston 5 and the outer peripheral surface of the inner pipe 3 is provided by the O ring 51, and the liquid tightness between the outer periphery of the free piston 5 and the inner peripheral surface of the cylinder 1 is provided by the O ring 52. The outer peripheral surface of the piston ring 53 slidably comes into contact with the inner peripheral surface of the cylinder 1. The piston ring 53 defines and functions as a sliding bearing.

As shown in FIG. 4, the fitting 12 is attached to the lower end of the inner pipe 3. The fitting 12 includes an upper fitting portion 12A and a lower fitting portion 12B. The upper fitting portion 12A is fitted into an opening at the lower end of the inner pipe 3. Thus, the lower end of the inner pipe 3 is closed. An O ring 54 is attached to the outer periphery of the upper fitting portion 12A. The lower fitting portion 12B projects downwardly from the lower end of the upper fitting portion 12A. The closure 11 includes a concave portion 11a directed towards the inside of the cylinder 1. The lower fitting portion 12B is fitted into the concave portion 11a of the closure 11.

A hole 11b is provided in the center portion of the closure 11. As shown in FIG. 5, a gas introduction groove 121 extends linearly and outwardly from the center portion of the lower surface of the lower fitting portion 12B. While the hole 11b is closed in FIG. 4, the hole 11b is not closed and is connected to the gas introduction groove 121 of the fitting portion 12B at the time of assembly of the suspension device 100.

At the time of assembly of the suspension device 100, gas is introduced into the gas chamber G1 through the hole 11b and the gas introduction groove 121 with the lower fitting portion 12B of the fitting 12 fitted into the concave portion 11a of the closure 11. Thus, it is possible to seal the gas in the gas chamber G1 while inhibiting complication of configuration and an increase in number of components.

It is possible to adjust the pressure in the gas chamber G1 by adjusting an amount of gas to be introduced into the gas chamber G1. Thus, the position of the free piston 5 in the axial direction can be adjusted. The pressure in the gas chamber G1 and the position of the free piston 5 are adjusted, and then resin, for example, is put in the hole 11b of the closure 11. Thus, the hole 11b is closed as shown in the example of FIG. 4. Instead of introduction of gas into the gas chamber G1 through the hole 11b and the gas introduction groove 121, a gas introduction port that is connected to the gas chamber G1 may be provided in a side portion of the cylinder 1, for example, and gas may be introduced into the gas chamber G1 through the gas introduction port.

As shown in FIG. 6, a gas inlet outlet port 41b is provided in the upper end of the upper rod 41 to be connected to the inner passage IP1. A valve VA is attached to the gas inlet outlet port 41b. The valve VA includes a cylindrical portion 61, a rod portion 62 and a valve body 63. The cylindrical portion 61 includes an inner passage 61a extending in the axial direction. The cylindrical portion 61 is fitted into the gas inlet outlet port 41b such that the outer peripheral surface of the cylindrical portion 61 and the inner peripheral surface of the gas inlet outlet port 41b abut against each other hermetically. The rod portion 62 extends in the axial direction to pass through the inner passage 61a.

The valve body 63 is provided at the lower end of the rod portion 62. The diameter of the valve body 63 is larger than the diameter of the inner passage 61a. The rod portion 62 is biased upwardly by a biasing member (not shown) such that the valve body 63 is pressed against the lower end of the cylindrical portion 61. The valve body 63 is pressed against the lower end of the cylindrical portion 61, so that the opening at the lower end of the inner passage 61*a* is closed hermetically.

When the rod portion 62 is pressed downwardly, the valve body 63 is spaced apart from the cylindrical portion 61, and the opening at the lower end of the inner passage 61*a* is opened. In this case, gas is able to be introduced into the inner passage IP1 of the upper rod 41, and gas is able to flow out from the inner passage IP1 of the upper rod 41, through the inner passage 61*a* of the cylindrical portion 61. When the pressure applied to the rod portion 62 is released, the opening at the lower end of the inner passage 61*a* is opened by the valve body 63. Therefore, a flow of gas from the inner passage IP1 is blocked. In the following description, the valve VA being opened refers to the opening at the lower end of the inner passage 61*a* being opened when the rod portion 62 is pressed downwardly. Further, the valve VA being closed refers to the opening at the lower end of the inner passage 61*a* being closed by the valve body 63.

Figure 7:
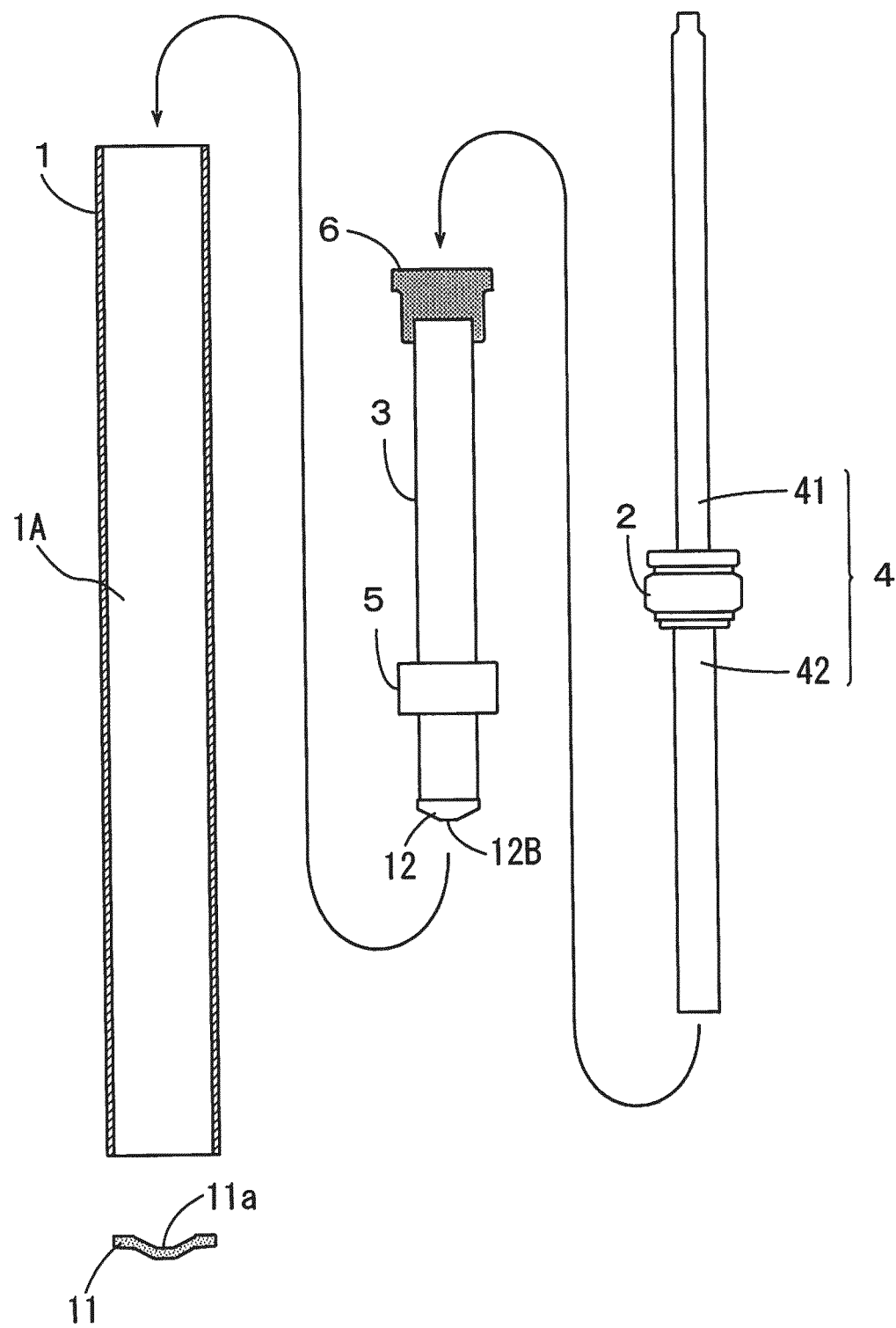
FIG. 7 is a schematic cross sectional view for explaining assembly of the suspension device.
Figure 8:
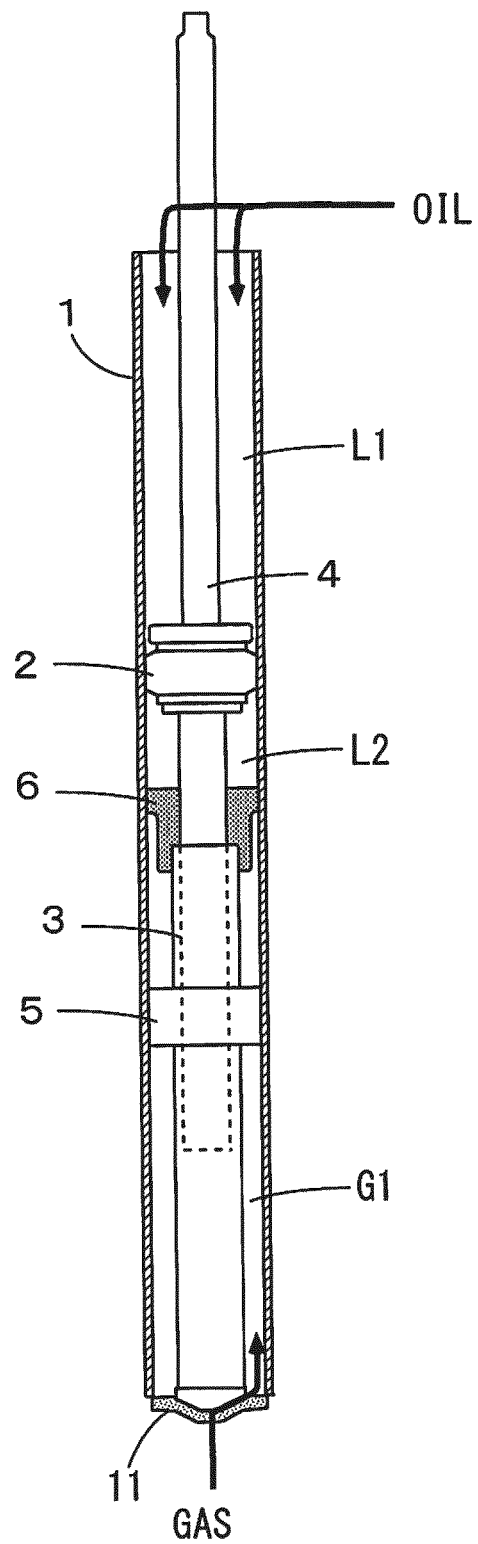
FIG. 8 is a schematic cross sectional view for explaining the assembly of the suspension device.
Figure 9:
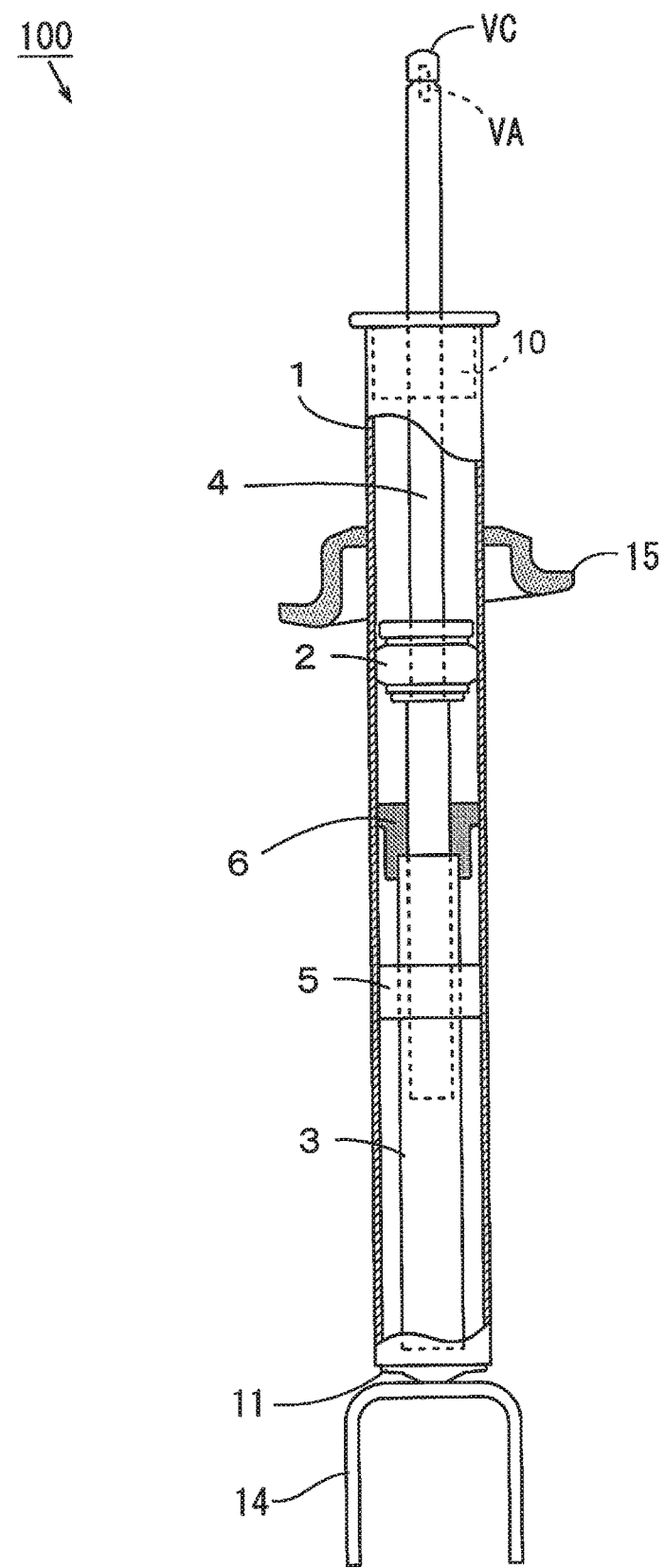
FIG. 9 is a schematic cross sectional view for explaining the assembly of the suspension device.

FIGS. 7 to 9 are schematic cross sectional views for explaining the assembly of the suspension device 100. First, as shown in FIG. 7, the closure 11 is attached to the lower end of the cylinder 1, and the inner pipe 3, the fitting 12, the free piston 5, the support 6, the piston 2 and the piston rod 4 are arranged in the cylinder chamber 1A through the opening at the upper end of the cylinder 1.

In this case, the fitting 12, the free piston 5 and the support 6 are inserted into the cylinder chamber 1A while being attached to the inner pipe 3. As described above, the lower fitting portion 12B of the fitting 12 is fitted into the concave portion 11*a* of the closure 11. Thus, the inner pipe 3 is able to be easily positioned in the cylinder 1. The upper rod 41, the lower rod 42 and the piston 2 are integrally inserted into the cylinder chamber 1A while being coupled to one another.

Next, as shown in FIG. 8, oil is introduced into the liquid chambers L1, L2 from the opening at the upper end of the cylinder 1. Further, gas is introduced into the gas chamber G1 through the hole 11*b* (FIG. 4) of the closure 11 and the gas introduction groove 121 (FIG. 5) of the fitting 12. The hole 11*b* of the closure 11 is closed after the introduction of gas.

Next, as shown in FIG. 9, the support closure 10 is attached to the upper end of the cylinder 1. Further, the attachment 14 is attached to the closure 11, and a spring holder 15 is attached to the outer peripheral surface of the cylinder 1. Further, the valve VA and the valve cover VC are attached to the upper end of the piston rod 4. Thus, the suspension device 100 of FIG. 1 is completed.

The extending contracting operation of the suspension device 100 is described with reference to FIGS. 2 to 4. In the following description, the force applied to the suspension device 100 in such a manner that the piston rod 4 is pulled out of the cylinder 1 is referred to as force in an extending direction, and the force applied to the suspension device 100 in such a manner that the piston rod 4 is pushed into the cylinder 1 is referred to as force in a contracting direction.

The force in the extending direction is applied to the suspension device 100 from the outside. As a result, the piston 2 and the piston rod 4 are moved integrally and upwardly with respect to the cylinder 1. Thus, the suspension device 100 extends. In this case, an oil pressure travels to the valve plates 32 (FIG. 2) through the through holes 2A (FIG. 2) of the piston 2 from the liquid chamber L1 (FIG. 2), and the valve plates 32 are bent downwardly. Thus, the lower end openings of the through holes 2A are opened, and a portion of the oil in the liquid chamber L1 flows into the liquid chamber L2 through the through holes 2A of the piston 2.

On the other hand, the force in the contracting direction is applied to the suspension device 100 from the outside. As a result, the piston 2 and the piston rod 4 are moved integrally and downwardly with respect to the cylinder 1. Thus, the suspension device 100 contracts. In this case, an oil pressure travels to the valve plates 31 (FIG. 2) through the through holes 2B (FIG. 2) of the piston 2 from the liquid chamber L2 (FIG. 2), and the valve plates 31 are bent upwardly. Thus, the upper end openings of the through holes 2B are opened, and a portion of the oil in the liquid chamber L2 flows into the liquid chamber L1 through the through holes 2B of the piston 2.

A resistance (mainly the resistance from the valve plates 31) is exerted on the flow of oil due to the movement of the piston 2. Thus, kinetic energy is converted into thermal energy. As a result, the resistance to the flow of oil is exerted as a damping force.

In the present example, the oil in the liquid chambers L1, L2 of FIG. 2 is pressurized by the gas in the gas chamber G1 of FIG. 3. In this case, even in a no-load state, a repulsive force (hereinafter referred to as a regular reaction force) in the axial direction is exerted on the piston 2 by the oil pressures in the liquid chambers L1, L2. The direction and magnitude of the regular reaction force depend on the difference between a pressure-receiving area (hereinafter referred to as an upper pressure-receiving area) that receives pressure from the liquid chamber L1 in the axial direction on the piston 2 and a pressure-receiving area (hereinafter referred to as a lower pressure-receiving area) that receives pressure from the liquid chamber L2 in the axial direction on the piston 2.

In the present example, the upper pressure-receiving area is equivalent to the value obtained by subtracting the area of the transverse cross section of the upper rod 41 from the area of the transverse cross section of the cylinder chamber 1A. The lower pressure-receiving area is equivalent to the value obtained by subtracting the area of the transverse cross section of the lower rod 42 from the area of the transverse cross section of the cylinder chamber 1A. Here, the transverse cross section is a cross section orthogonal to the axial center CL.

As described above, the outer diameter of the upper rod 41 is smaller than the outer diameter of the lower rod 42. Therefore, the upper pressure-receiving area of the piston 2 is larger than the lower pressure-receiving area of the piston 2. In this case, the downward force applied from the liquid chamber L1 to the piston 2 is larger than the upward force applied from the liquid chamber L2 to the piston 2. Therefore, the downward force (the contracting direction force) is exerted on the piston 2 as a regular reaction force. Thus, the suspension device 100 contracts in the no-load state.

When the suspension device 100 is attached to the mobile object, it is necessary to adjust the length (hereinafter referred to as a projection length) by which the piston rod 4 projects from the cylinder 1 to a predetermined length. In the present preferred embodiment, the projection length of the piston rod 4 is able to be adjusted by introducing gas into the gas chamber G2 in the inner pipe 3 through the inner passages IP1, IP2 (FIG. 2) of the piston rod 4.

Figure 10:
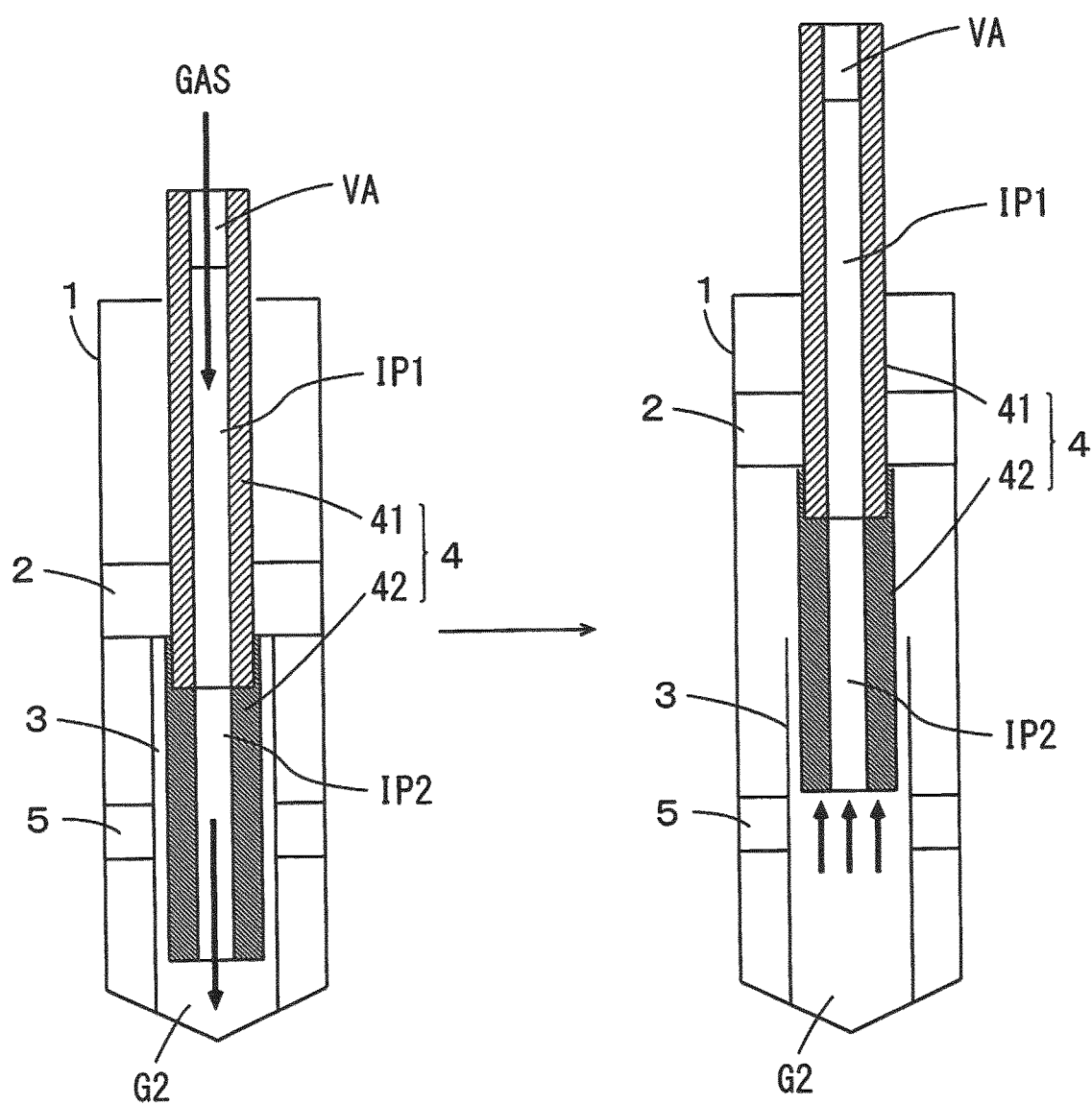
FIG. 10 is a schematic diagram for explaining adjustment of a projection length of a piston rod.

FIG. 10 is a schematic diagram for explaining the adjustment of the projection length of the piston rod 4. As shown in FIG. 10, with the valve cover VC (FIG. 6) detached and the valve VA opened, gas is introduced into the gas chamber G2 through the inner passages IP1, IP2 of the piston rod 4.

Thus, the pressure in the gas chamber G2 is increased, and the upward force is exerted on the lower rod 42. The piston 2 and the piston rod 4 are moved integrally and upwardly by this force. As a result, the projection length of the piston rod 4 is able to be increased. In a case where the projection length of the piston rod 4 is increased to be unnecessarily large, the gas in the gas chamber G2 is allowed to flow out through the inner passages IP1, IP2 of the piston rod 4. In this case, the pressure in the gas chamber G2 is decreased, so that the piston 2 and the piston rod 4 are moved integrally and downwardly by the regular reaction force. Thus, the projection length of the piston rod 4 is decreased. In this manner, the projection length of the piston rod 4 is able to be adjusted to a desired length. Thereafter, the valve VA is closed, so that a flow of gas from the gas chamber G2 is blocked. Therefore, the projection length of the piston rod 4 is able to be stably maintained at the desired length.

The suspension device 100 is attached to the mobile object, and then the valve VA is opened. Thus, the gas in the gas chamber G2 flows out through the inner passages IP1, IP2 of the piston rod 4. In this case, the pressure in the gas chamber G2 returns to a normal pressure, so that the pressure in the gas chamber G2 is prevented from interfering with the movement of the piston rod 4.

Figure 11:
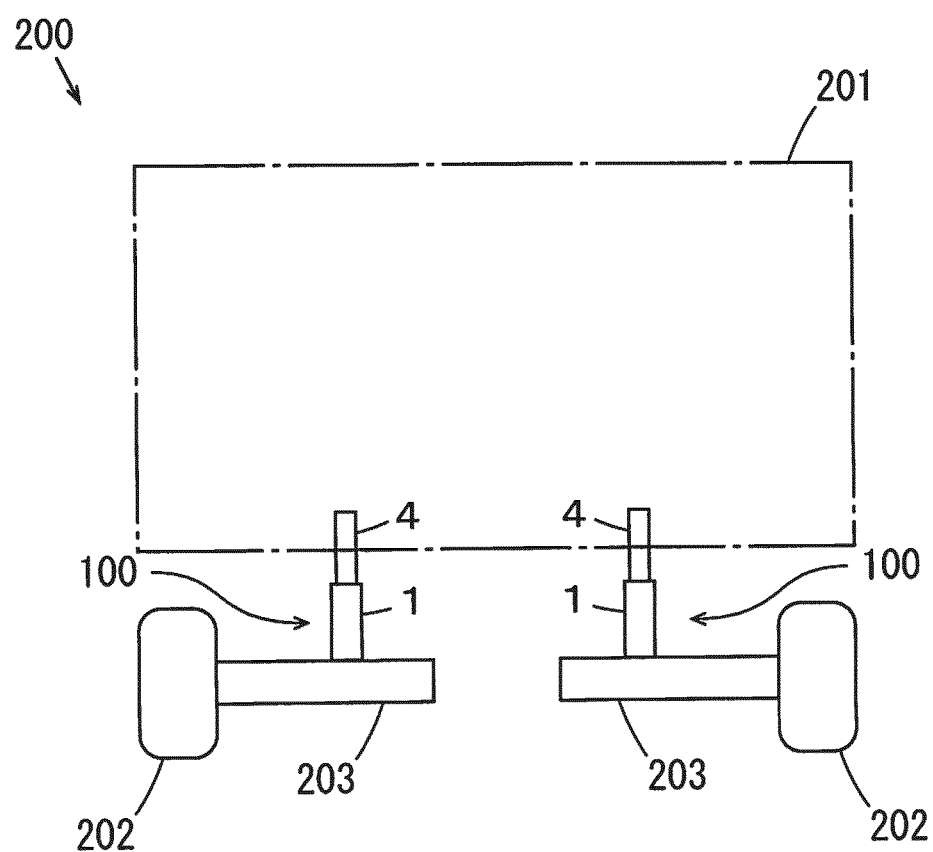
FIG. 11 is a schematic diagram for explaining a vehicle including the suspension device.

FIG. 11 is a schematic diagram for explaining a vehicle including the suspension device 100. A vehicle 200 of FIG. 11 is a four-wheeled automobile. FIG. 11 schematically shows the vehicle 200 as viewed from behind. The vehicle 200 includes a vehicle body 201, a pair of left and right wheels 202 (front wheels, for example) and a pair of left and right lower arms 203 (front lower arms, for example). The vehicle body 201 includes a vehicle base, a main body frame and the like. The left and right lower arms 203 are respectively coupled to the pair of left and right wheels 202, and are moved integrally with the left and right wheels 202 with respect to the vehicle body 201.

A pair of left and right suspension devices 100 is respectively attached between the vehicle body 201 and the left and right lower arms 203. Specifically, the cylinders 1 of the suspension devices 100 are coupled to the lower arms 203 of FIG. 11 with the attachments 14 and the couplings 16 of FIG. 1, and the piston rods 4 of the suspension devices 100 are coupled to the vehicle body 201 with the couplings 17 of FIG. 1. While the vehicle 200 is traveling, each suspension device 100 contracts. For example, when the vehicle 200 turns left, a centrifugal force is exerted in such a direction that the vehicle body 201 is tilted rightwardly. In this case, the force in the extending direction is exerted on the left suspension device 100, and the force in the contracting direction is exerted on the right suspension device 100. Further, when the vehicle 200 turns right, a centrifugal force is exerted in such a direction that the vehicle body 201 is tilted leftwardly. In this case, the force in the extending direction is exerted on the right suspension device 100, and the force in the contracting direction is exerted on the left suspension device 100.

When the vehicle 200 turns, a rider experiences a floating sensation since the vehicle body 201 is tilted. Such a floating sensation may reduce the riding comfort of the rider. In the present example, the force in the contracting direction is exerted on the suspension device 100 as a regular reaction force. Therefore, tilting of the vehicle body 201 is suppressed when the vehicle 200 turns. Specifically, when the vehicle 200 turns left, extension of the left suspension device 100 is suppressed by a regular reaction force. Thus, the rightward tilting of the vehicle body 201 is suppressed. Further, when the vehicle 200 turns right, the extension of the right suspension device 100 is suppressed by the regular reaction force. Thus, the leftward tilting of the vehicle body 201 is suppressed. As a result, a floating sensation to be experienced by the rider is reduced when the vehicle 200 turns, so that the riding comfort of the rider is improved.

In the suspension device 100 according to the present preferred embodiment, gas is able to be introduced into the gas chamber G2 in the inner pipe 3 or gas is able to be allowed to flow out from the gas chamber G2, through the inner passage IP1 provided in the upper rod 41 and the inner passage IP2 provided in the lower rod 42. Thus, the pressure in the gas chamber G2 is able to be increased or decreased, such that the piston rod 4 is able to be moved integrally in the axial direction. Therefore, the projection length of the piston rod 4 is able to be easily adjusted. As a result, since it is possible to attach the suspension device to a mobile object such as a vehicle without complicated work, a burden on the operator is able to be reduced.

While the upper rod 41 and the lower rod 42 are provided separately in the above-mentioned preferred embodiment, the upper rod 41 and the lower rod 42 may be provided as an integrated member. In this case, the inner passages IP1, IP2 that communicate with the gas chamber G2 are provided in the integrally formed piston rod 4.

While the valve VA is attached to the gas inlet outlet port 41b of the upper rod 41 in the above-mentioned preferred embodiment, another member may be used instead of the valve VA. For example, a closure that closes the inner passage IP1 hermetically may be detachably and attachably attached to the gas inlet outlet port 41b. When the suspension device 100 is attached to a mobile object, the closure is detached, and gas is introduced into the gas chamber G2 through the inner passages IP1, IP2. The projection length of the piston rod 4 is adjusted, and then the closure is attached to the piston rod 4. Thus, the projection length of the piston rod 4 is maintained. The closure is detached again after the suspension device 100 is attached to the mobile object. As a result, the pressure in the gas chamber G2 returns to a normal pressure.

Alternatively, the inner passage IP1 may be opened with no use of the valve VA or another member. In this case, the suspension device 100 is attached to the mobile object while gas is introduced into the gas chamber G2 through the inner passages IP1, IP2. Thus, it is possible to attach the suspension device 100 to the mobile object while adjusting the projection length of the piston rod 4. The introduction of gas into the gas chamber G2 is stopped after the suspension device 100 is attached to the mobile object. As a result, the pressure in the gas chamber G2 returns to a normal pressure. Further, the gas inlet outlet port 41b may be provided not in the upper end of the upper rod 41 but in another portion (a side portion, for example) of the upper rod 41 positioned outside of the cylinder 1.

While each member is configured such that the upper pressure-receiving area of the piston 2 is larger than the lower pressure-receiving area in the above-mentioned preferred embodiment, each member may be configured such that the upper pressure-receiving area is smaller than the lower pressure-receiving area.

While the axial center CL of the cylinder 1 extends in the top-and-bottom direction and the piston rod 4 projects upwardly of the cylinder 1 in the above-mentioned preferred embodiment, the orientation of the suspension device 100 is not limited to this. For example, the orientation of the suspension device 100 may be changed such that the piston rod 4 projects downwardly of the cylinder 1. In this case, the cylinder 1 is coupled to the vehicle body 201 of FIG. 11, for example, and the piston rod 4 is coupled to the lower arm 203 of FIG. 11, for example. Alternatively, the orientation of the suspension device 100 may be changed such that the axial center CL of the cylinder 1 is inclined with respect to the top-and-bottom direction, or may be changed such that the axial center CL of the cylinder 1 extends in a transverse direction.

The suspension device 100 according to the above-mentioned preferred embodiment may be used in not only a four-wheeled automobile as described in the example of FIG. 11, but also another vehicle such as a motor tricycle, a motorcycle or an ATV (All Terrain Vehicle). The suspension device 100 may be used in another mobile object such as a boat, a snowmobile, a motorboat and a walking robot.

In the following paragraphs, non-limiting examples of correspondences between various elements recited in the claims below and those described above with respect to various preferred embodiments of the present invention are explained.

In the above-mentioned preferred embodiment, the cylinder 1 is an example of a cylinder, the lower end 1a is an example of a first end, the upper end 1b is an example of a second end, the piston 2 is an example of a first piston, the inner pipe 3 is an example of an inner pipe, the lower rod 42 is an example of a first rod, the upper rod 41 is an example of a second rod, the closure 11 is an example of a closure, the support closure 10 is an example of a first support, the free piston 5 is an example of a second piston, the liquid chamber L1 is an example of a first liquid chamber, the liquid chamber L2 is an example of a second liquid chamber, the gas chamber G1 is an example of a first gas chamber, the gas chamber G2 is an example of a second gas chamber, the inner passage IP2 is an example of a first inner passage, and the inner passage IP1 is an example of a second inner passage. Further, the concave portion 11a is an example of a concave portion, the fitting 12 is an example of a fitting portion, the hole 11b and the gas introduction groove 121 are examples of a gas passage, the support 6 is an example of a second support, the gas inlet outlet port 41b is an example of a gas inlet outlet port, and the valve VA is an example of a valve.

As each of the elements recited in the claims, various other elements having configurations or functions described in the claims can be also used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A suspension device comprising:
a cylinder including an axial center extending in one direction and first and second ends;
a first piston movable in an axial direction inside of the cylinder;
an inner pipe provided inside of the cylinder to extend in the axial direction between the first piston and the first end;
a first rod coupled to the first piston and extending in the axial direction to be inserted into the inner pipe;
a second rod coupled to the first piston and extending in the axial direction to project outwardly from the cylinder through the second end;
a closure to close the first end;
a first support to support the second rod that is movable in the axial direction while closing the second end;
a second piston movable in the axial direction while sealing a space between an outer surface of the inner pipe and an inner surface of the cylinder; wherein
a first liquid chamber is located between the first piston and the first support, and inside of the cylinder;
a second liquid chamber is located between the first piston and the second piston, inside of the cylinder and outside of the inner pipe;
a liquid passage that connects the first liquid chamber to the second liquid chamber is provided in the first piston, and liquid is sealed in the first and second liquid chambers;
a first gas chamber is located between the second piston and the closure, inside of the cylinder and outside of the inner pipe;
a second gas chamber in which gas is sealed is located inside of the inner pipe;
the first rod includes a first inner passage that communicates with the second gas chamber; and
the second rod includes a second inner passage that communicates with the first inner passage; wherein
the closure includes a concave portion directed inwardly of the cylinder;
the suspension device further comprises a fitting portion that is fitted to the concave portion while closing an end of the inner pipe; and
a gas passage that communicates with the first gas chamber is located in at least one of the closure and the fitting portion.

2. The suspension device according to claim 1, further comprising a second support that supports the inner pipe with respect to the cylinder while being located between the first piston and the second piston.

3. The suspension device according to claim 1, wherein a pressure-receiving area of the first piston that receives pressure from the first liquid chamber in the axial direction is larger than a pressure-receiving area of the first piston that receives pressure from the second liquid chamber in the axial direction.

4. A suspension device comprising:
a cylinder including an axial center extending in one direction and first and second ends;
a first piston movable in an axial direction inside of the cylinder;
an inner pipe provided inside of the cylinder to extend in the axial direction between the first piston and the first end;
a first rod coupled to the first piston and extending in the axial direction to be inserted into the inner pipe;
a second rod coupled to the first piston and extending in the axial direction to project outwardly from the cylinder through the second end;
a closure to close the first end;
a first support to support the second rod that is movable in the axial direction while closing the second end;
a second piston movable in the axial direction while sealing a space between an outer surface of the inner pipe and an inner surface of the cylinder; wherein
a first liquid chamber is located between the first piston and the first support, and inside of the cylinder;
a second liquid chamber is located between the first piston and the second piston, inside of the cylinder and outside of the inner pipe;
a liquid passage that connects the first liquid chamber to the second liquid chamber is provided in the first piston, and liquid is sealed in the first and second liquid chambers;

a first gas chamber is located between the second piston and the closure, inside of the cylinder and outside of the inner pipe;
a second gas chamber in which gas is sealed is located inside of the inner pipe;
the first rod includes a first inner passage that communicates with the second gas chamber; and
the second rod includes a second inner passage that communicates with the first inner passage; wherein
the second rod includes a gas inlet outlet port that opens outside of the cylinder;
the second inner passage communicates with an outer space through the gas inlet outlet port; and
the suspension device further comprises a valve attached to the gas inlet outlet port to enable introduction of gas into the second inner passage and block a flow-out of gas from the second inner passage.

\* \* \* \* \*